US008797462B2

(12) United States Patent
Hirai

(10) Patent No.: US 8,797,462 B2
(45) Date of Patent: Aug. 5, 2014

(54) IMAGE PROCESSING APPARATUS AND IMAGE PROCESSING METHOD

(75) Inventor: Shinya Hirai, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 472 days.

(21) Appl. No.: 13/025,053

(22) Filed: Feb. 10, 2011

(65) Prior Publication Data
US 2011/0199542 A1   Aug. 18, 2011

(30) Foreign Application Priority Data

Feb. 12, 2010   (WO) ................. PCT/JP2010/052028

(51) Int. Cl.
*H04N 5/00* (2011.01)
(52) U.S. Cl.
USPC ........... 348/624; 348/609; 348/610; 348/611; 348/612; 348/613; 348/614; 348/615; 348/616; 348/617; 348/618; 348/619; 348/620; 348/621; 348/622; 348/623; 348/625; 348/626; 348/627; 348/628; 348/629
(58) Field of Classification Search
USPC ................................. 348/606–629
See application file for complete search history.

(56) References Cited

U.S. PATENT DOCUMENTS

| 2006/0101080 | A1 | 5/2006 | Atsumi |
| 2008/0122953 | A1* | 5/2008 | Wakahara et al. ............ 348/241 |
| 2009/0208129 | A1 | 8/2009 | Shimodaira |

FOREIGN PATENT DOCUMENTS

| JP | 2003-348609 A | | 12/2003 |
| JP | 2003348609 A | * | 12/2003 |
| JP | 2008-015741 A | | 1/2008 |
| JP | 2008-072377 A | | 3/2008 |
| JP | 2009-199104 A | | 9/2009 |
| JP | 2009199104 A | * | 9/2009 |
| WO | 2004-004361 A1 | | 1/2004 |

* cited by examiner

*Primary Examiner* — Roberto Velez
*Assistant Examiner* — Yih-Sien Kao
(74) *Attorney, Agent, or Firm* — Canon USA, Inc. IP Division

(57) ABSTRACT

A band processing circuit which generates image signals corresponding to different frequency bands from an image signal in which signals corresponding to different colors are arranged and which suppresses noise by synthesizing the image signals of the different frequency bands, a sampling circuit which generates image signal corresponding to the colors by sampling the image signal input from the band processing circuit in accordance with a predetermined arrangement, and a luminance/color generation circuit which generates a luminance signal in which aliasing is suppressed using an image signal output from the sampling circuit.

18 Claims, 15 Drawing Sheets

FIG. 5

| −1 | −1 | −1 |
|----|----|----|
| −1 | 8  | −1 |
| −1 | −1 | −1 |

FIG. 13

| R | G1 | R | G1 | R | G1 | R | G1 | R | G1 | R | G1 |
|---|----|---|----|---|----|---|----|---|----|---|----|
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |
| R | G1 | R | G1 | R | G1 | R | G1 | R | G1 | R | G1 |
| G2 | B | G2 | B | G2 | B | G2 | B | G2 | B | G2 | B |

IMAGE PROCESSING APPARATUS AND IMAGE PROCESSING METHOD

TECHNICAL FIELD

The present invention relates to image processing performed for suppressing aliasing generated in an image signal.

BACKGROUND ART

Various types of color filter of an image pickup element such as a CCD sensor or a CMOS sensor have been used, and examples of such a color filter include a color filter having a combination of primary colors (red, green, and blue) and a color filter having a combination of complementary colors (cyan, magenta, and yellow).

FIG. 13 is a diagram illustrating a primary-color Bayer arrangement of an image pickup element. Red (R) and blue (B) are diagonally arranged in a pixel matrix of 2×2, green (G1 and G2) is diagonally arranged in the remaining two pixels, and this pattern is repeated.

When an object includes a high frequency component which exceeds resolution capability of the image pickup element, aliasing is generated in an image signal generated by the image pickup element due to an adverse effect of the high frequency component. Therefore, various methods for suppressing aliasing have been proposed. For example, a method using a combination of two luminance signals generated in different ways has been proposed in order to suppress generation of aliasing.

One of the luminance signals is generated only using signals corresponding to G (G1, G2) pixels without using signals corresponding to R and B pixels. First, values of signals other than signals corresponding to the G pixels among the signals corresponding to the R, G, and B pixels obtained by digitalizing a signal output from the image pickup element having the primary-color Bayer arrangement are set to 0. Next, a vertical lowpass filter (V-LPF) process which restricts a band in a vertical direction and a horizontal lowpass filter (H-LPF) which restricts a band in a horizontal direction are performed. By this, signals of pixels which have been subjected to compensation using the signals corresponding to the G pixels are generated and a luminance signal of G is obtained. Hereinafter, a luminance signal obtained by performing compensation on pixels which do not correspond to a certain color using signals corresponding to the certain color is referred to as a first luminance signal.

Alternatively, values of signals other than signals of the R pixels are set to 0 and similarly the V-LPF process and the H-LPF process are performed to thereby generate a luminance signal of R. Similarly, values of signals other than signals of the B pixels are set to 0 and similarly the V-LPF process and the H-LPF process are performed to thereby generate a luminance signal of B. Then, the luminance signals of R and B are added to the luminance signal of G, and a resultant signal may be referred to as a first luminance signal.

The other luminance signal is generated using signals of all the colors of the primary-color Bayer arrangement shown in FIG. 13. The V-LPF process which restricts a band in the vertical direction and the H-LPF which restricts a band in the horizontal direction are performed on the signals corresponding to the pixels of all the R, G, and B colors which are obtained by digitalizing the signals output from the image pickup element having the primary-color Bayer arrangement without distinguishing the colors so that a signal is newly obtained. Hereinafter, such a luminance signal obtained using the signals of all the colors without distinguishing the colors is referred to as a second luminance signal.

FIG. 14 is a diagram illustrating spatial frequency characteristics in which the first and second luminance signals can be resolved. An x axis denotes a frequency space in a horizontal (H) direction of an object and a y axis denotes a frequency space in a vertical (V) direction of the object. The further a point is located from an intersection between the x axis and the y axis, the higher a spatial frequency in the point is.

Resolution limits in the horizontal and vertical directions of the first luminance signal generated only using the signals corresponding to the G pixels are equal to a Nyquist frequency ($\pi/2$) of an arrangement of the G pixels. However, since some diagonal lines do not include the G pixels, a limit resolution frequency in a diagonal direction is lower than those in the horizontal and vertical directions and an inside portion of a region 1401 having a diamond shape shown in FIG. 14 corresponds to a spatial frequency in which the first luminance signal can be resolved. Since, among the R, G, and B luminance signals, the G luminance signal obtained only using the signals corresponding to the G pixels has the highest resolution, even when the first luminance signal is generated by synthesizing the R, G, and B luminance signals with one another, the same spatial frequency in which the first luminance signal can be resolved is obtained.

On the other hand, since the second luminance signal is generated using the signals corresponding to all the color pixels, when the object is achromatic, an outer square region 1402 shown in FIG. 14 corresponds to a spatial frequency in which the second luminance signal can be resolved. Unlike the first luminance signal, since any one of the color pixels is included in all lines diagonally extending, a spatial frequency in a diagonal direction in which the second luminance signal can be resolved is higher than that of the first luminance signal. However, when a red object is captured, for example, signals output from the pixels other than the R pixels are negligible. Accordingly, only a resolution corresponding to a region 1403 which is a quarter of the region corresponding to the achromatic object is obtained.

Taking characteristics of the first and second luminance signals described above into consideration, a configuration for suppressing aliasing included in an image signal by generating a luminance signal has been proposed. For example, a configuration for generating a luminance signal by changing a mixing ratio of the first and second luminance signals depending on a determination as to whether an object is achromatic or chromatic has been proposed (refer to Patent Literature 1). Furthermore, a configuration for generating a luminance signal by changing a mixing ratio of the first and second luminance signals depending on a degree of the diagonal correlation of an object shown in FIG. 14 has been proposed (refer to Patent Literature 2).

However, although these methods are useful in terms of the suppression of aliasing, noise signals other than the aliasing are not suppressed. For example, in recent years, miniaturization of pixels of image pickup elements has been developed. Therefore, noise may be increased due to the miniaturization of pixels. Although various methods for suppressing such noise by performing signal processing have been proposed, image blur is generated when such noise is suppressed, which is an adverse effect.

To address this problem, a method for suppressing noise by dividing an image signal into a plurality of frequency components has been proposed (refer to Patent Literature 3). Furthermore, a method for suppressing noise by generating an image signal by reducing an image signal and synthesizing the reduced image signal with the original image signal has been proposed (Patent Literature 4).

Specifically, a reduction process is performed on a signal of an input image so that a reduced image including a frequency component lower than that of the input image is generated. Then, edge strength is detected using the reduced image signal having the low frequency component, and a region in which an edge component is to be maintained is obtained in accordance with the edge strength. Weights of regions are changed so that an image included in the region in which the edge component is to be maintained is not blurred and the original image signal and the reduced image signal having the low frequency component are synthesized with each other to thereby newly generate an image signal.

CITATION LIST

Patent Literature

PTL 1 Japanese Patent Laid-Open No. 2003-348609
PTL 2 Japanese Patent Laid-Open No. 2008-072377
PTL 3 Japanese Patent Laid-Open No. 2008-015741
PTL 4 Japanese Patent Laid-Open No. 2009-199104

However, the method for suppressing noise by synthesizing image signals of a plurality of frequency bands does not take aliasing into consideration.

Here, in a case of a sensor of a single plate such as the primary-color Bayer arrangement, when a downsampling process is performed at a time of band division, all pixels may have color signals without performing compensation on pixels of colors corresponding to signals of 0. When a certain row in the Bayer arrangement of the image pickup element is taken as an example, as shown in FIG. 15, color filters R, G, R, G, R, G, and so on are arranged in this order. A case where the downsampling process is performed on half of pixels in the horizontal direction will be described as an example. In this row, when only R signals are focused on, the R signals originally arranged every other pixel are arranged in every pixels through the downsampling process. Furthermore, also when only G signals are focused on, the G signals originally arranged every other pixel are arranged in every pixels through the downsampling process. Note that, in the downsampling process performed on the G signals, a value of a pixel corresponding to each of the G signals is obtained by calculating an average of values of adjacent pixels in order to a position of the center of gravity of the G signal matches an R signal. As described above, by performing the downsampling process, all the R, G, and B color signals are generated at each pixel position without performing compensation on the pixels of the colors corresponding to the signals of 0. Therefore, aliasing may be suppressed in such an image signal generated through the downsampling process. Note that a process of generating signals of different colors for each pixel is referred to as synchronization.

An image signal generated through the downsampling process has been subjected to the synchronization. Therefore, when the original image signal is to be subjected to the synchronization with the image signal which has been subjected to the downsampling process, the original image signal should be subjected to the synchronization. However, since a single pixel corresponds to a single color in the original image signal, a compensation process should be performed on pixels of the individual colors which correspond to a signal of 0 in order to make each of the pixels have signals of all the colors. Therefore, since the original image signals are subjected to the synchronization although the original signals have been subjected to the downsampling process in order to suppress noise, an image signal obtained by synthesis include aliasing.

The present invention has been made in view of the problem described above and it is an object of the present invention to provide an image processing apparatus which performs a noise process by dividing an input signal according to a plurality of bands and which is capable of suppressing aliasing in an image signal generated by sampling performed by an image pickup element.

SUMMARY OF INVENTION

According to an aspect of the present invention, an apparatus includes a generation unit configured to receive an image signal in which signals corresponding to a plurality of colors are arranged and generate a plurality of image signals corresponding to different frequency bands using the received image signal, a synthesis unit configured to synthesize the plurality of image signals, a sampling unit configured to generate image signals from an image signal obtained through the synthesis by sampling the signals corresponding to the colors in accordance with the arrangement, a first generation unit configured to receive the image signals of the colors which have been subjected to the sampling and generate a first signal using an image signal obtained by performing compensation on pixels which do not correspond to a first color signal among pixels of the received image signal using the first color signal, a second generation unit configured to receive the image signals corresponding to the color signals including the first color signal and generate a second signal using the color signals, and a mixing unit configured to output a signal obtained by synthesizing the first and second signals or a signal obtained by selecting one of the first and second signals.

The present invention further provides an apparatus including a reduction unit configured to reduce an image signal in which signals corresponding to a plurality of colors are arranged so as to generate a reduced image signal, a generation unit configured to receive the reduced image signal and generate a plurality of image signals corresponding to different frequency bands from the image signal, a synthesis unit configured to synthesize the plurality of image signals, a first generation unit configured to receive the synthesized image signal and generate a first signal using an image signal obtained by performing compensation on pixels which do not correspond to a first color signal among the input image signals using the first color signal, a second generation unit configured to receive the synthesized image signal and generate a second signal using the plurality of color signals, a third generation unit configured to generate a third signal using the image signal, and a mixing unit configured to output a signal obtained by synthesizing the first and second signals with each other or a signal obtained by selecting one of the first and second signals when a rate of a size of the reduced image signal to a size of the image signal in which the signals corresponding to the plurality of colors are arranged is larger than a threshold value, and output the third signal when the rate is equal to or smaller than the threshold value.

Further features of the present invention will become apparent from the following description of exemplary embodiments with reference to the attached drawings.

BRIEF DESCRIPTION OF DRAWINGS

FIG. 5 is a diagram illustrating filter coefficients in an edge detection process performed by a synthesis ratio calculation circuit.

FIG. 13 is a diagram illustrating a primary-color Bayer arrangement of an image pickup element.

DESCRIPTION OF EMBODIMENTS

First Embodiment

Figure 1:
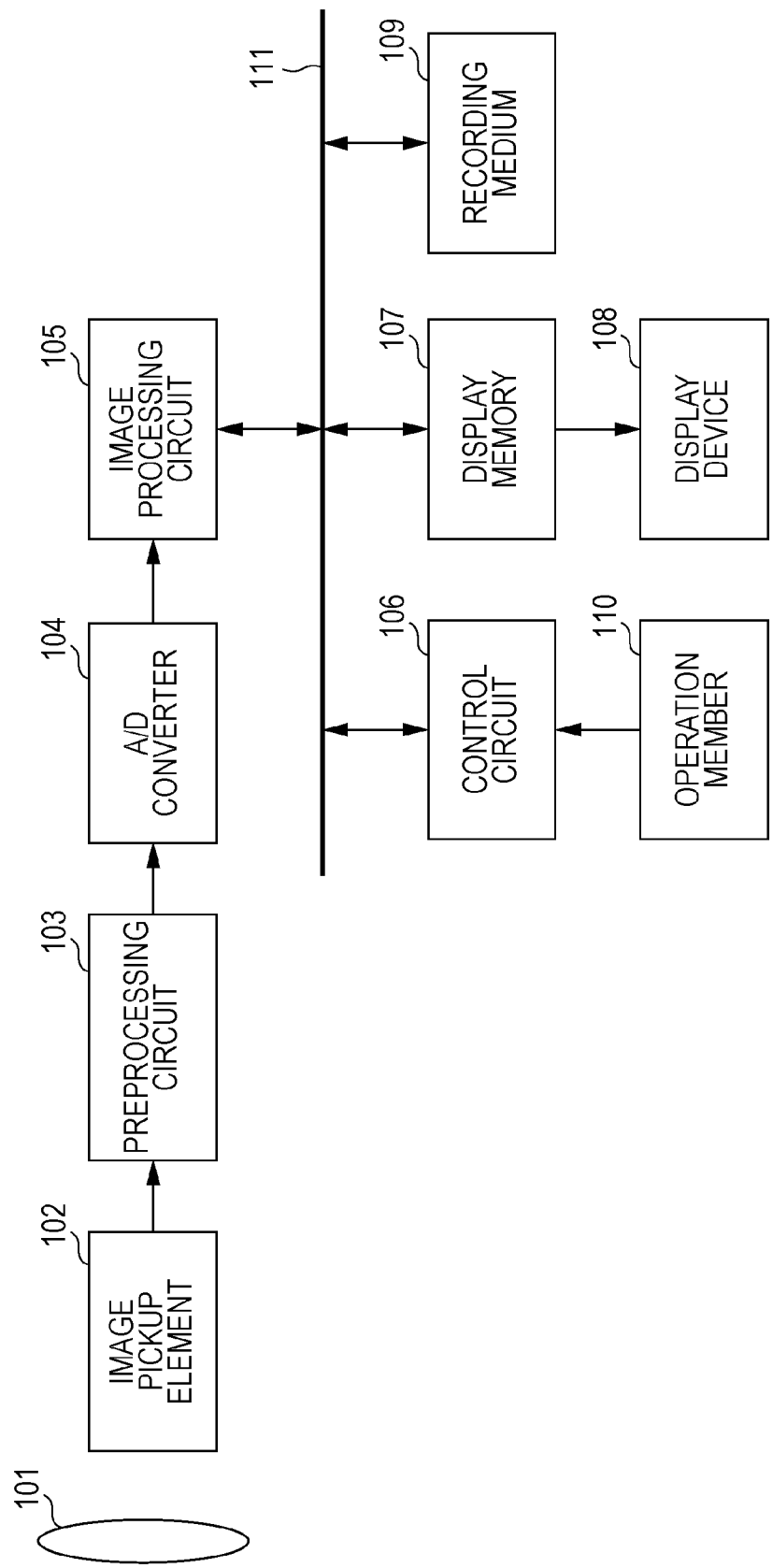
FIG. 1 is a diagram schematically illustrating a configuration of a digital still camera according to an embodiment of the present invention.

FIG. 1 is a diagram schematically illustrating a configuration of a digital still camera according to an embodiment of the present invention. The present invention can be realized by not only a digital still camera but also a digital video camera, a personal computer which includes an application relating to image processing, or the like as long as the image processing apparatus can perform image processing on an image signal.

In FIG. 1, an optical system 101 includes a lens unit including a zoom lens and a focus lens, an aperture device, and a shutter device. The optical system 101 controls magnification and a focus position of an object image which is supplied to an image pickup element 102 and light quantity. The image pickup element 102 is a photoelectric conversion element such as a CCD (Charge Coupled Device) sensor or a CMOS (Complementary Metal Oxide Semiconductor) sensor and generates an image signal by converting the object image into an electric signal. In this embodiment, the image pickup element 102 is constituted by a CCD sensor having a Bayer arrangement including color filters corresponding to R, G, and B.

A preprocessing circuit 103 includes a CDS (Correlated Double Sampling) circuit and an amplifying circuit. The CDS circuit suppresses dark current included in an image signal generated by the image pickup element 102 whereas the amplifying circuit amplifies an image signal output from the CDS circuit. An A/D converter 104 converts an image signal output from the preprocessing circuit 103 into a digital image signal.

An image processing circuit 105 performs a white balance process, a noise suppression process, a tone conversion process, and a contour correction process on the image signal so as to output the image signal as a luminance signal Y and color difference signals U and V. Furthermore, the image processing circuit 105 calculates a luminance value of the object and a focus value representing a focused state of the object using the image signal. The image processing circuit 105 performs the image processing not only on an image signal output from the A/D converter 104 but also on an image signal read from a recording medium 109. A control circuit 106 controls the various circuits included in the digital still camera of this embodiment so as to integrally control operation of the digital still camera. The control circuit 106 further controls driving of the optical system 101 and the image pickup element 102 in accordance with the luminance value obtained from the image signal which has been processed by the image processing circuit 105 and an instruction supplied from an operation member 110.

A display memory 107 temporarily stores an image signal which is a source of an image to be displayed in a display device 108. The display device 108 includes a liquid crystal display or an organic EL (Electro Luminescence) display and displays an image using an image signal generated by the image pickup element 102 or an image signal read from the recording medium 109. The display device 108 serves as an electronic view finder by appropriately updating and displaying image signals consecutively read from the image pickup element 102. The display device 108 may display not only an image but also text information such as a display state of the digital still camera, a shutter speed and an aperture value selected by a user or determined by the camera, and sensitivity information, and a graph representing distribution of luminance measured by the image processing circuit 105. The recording medium 109 which stores image signals may be attachable to the digital still camera or may be incorporated in the digital still camera.

The operation member 110 is operated when the user supplies an instruction to the digital still camera. A bus 111 is used to transmit/receive an image signal among the image processing circuit 105, the control circuit 106, the display memory 107, and the recording medium 109.

Next, an example of an operation of the digital still camera according to this embodiment at a time of image capturing will be described.

When the user operates the operation member 110 so as to supply an instruction for starting preparation of image capturing, the control circuit 106 start controlling operations of the circuits. The image pickup element 102 generates an analog image signal by photoelectrically converting an object image which is supplied through the optical system 101. The A/D converter 104 digitizes the analog image signal which has been processed by the preprocessing circuit 103. The image processing circuit 105 performs the white balance process, the noise suppression process, the tone conversion process, and the contour correction process.

The image signal which has been processed by the image processing circuit 105 is supplied through the display memory 107 to the display device 108 which displays an image corresponding to the image signal. As described above, the display device 108 functions as an electronic view finder by updating the image of the object in real time using read consecutive image signals and displaying the updated image.

This process is repeatedly performed until the user operates a shutter button included in the operation member 110. When the user operated the shutter button, the control circuit 106 controls the operation of the optical system 101 again in accordance with a luminance value and a focus value obtained by the image processing circuit 105 and captures a still image. The image processing circuit 105 performs the various image processes including the noise suppression process on an image signal corresponding to the still image. Then, the recording medium 109 records the image signal output from the image processing circuit 105. Note that the image processing circuit 105 performs the various image processes including the noise suppression process not only on still images but also captured movies.

Figure 2:
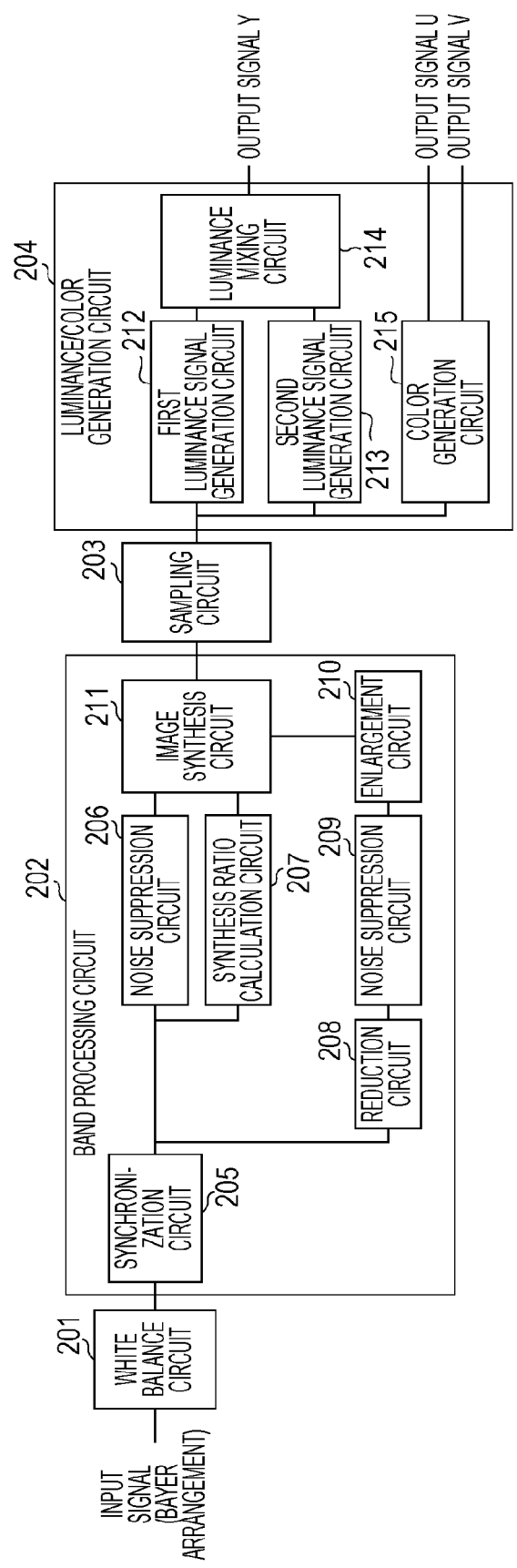
FIG. 2 is a diagram schematically illustrating a portion of a configuration of an image processing circuit according to a first embodiment of the present invention.

Here, the noise suppression process performed by the image processing circuit 105 which is a characteristic of the present invention will be described in detail. FIG. 2 is a diagram schematically illustrating a configuration of the image processing circuit 105.

The image processing circuit 105 of this embodiment includes a white balance circuit 201, a band processing circuit 202, a sampling circuit 203, and a luminance/color generation circuit 204. The band processing circuit 202 includes a synchronization circuit 205, a noise suppression circuit 206, a synthesis ratio calculation circuit 207, a reduction circuit 208, a noise suppression circuit 209, an enlargement circuit 210, and an image synthesis circuit 211. The luminance/color generation circuit 204 includes a first luminance signal generation circuit 212, a second luminance signal generation circuit 213, a luminance mixing circuit 214, and a color generation circuit 215.

Figure 3:
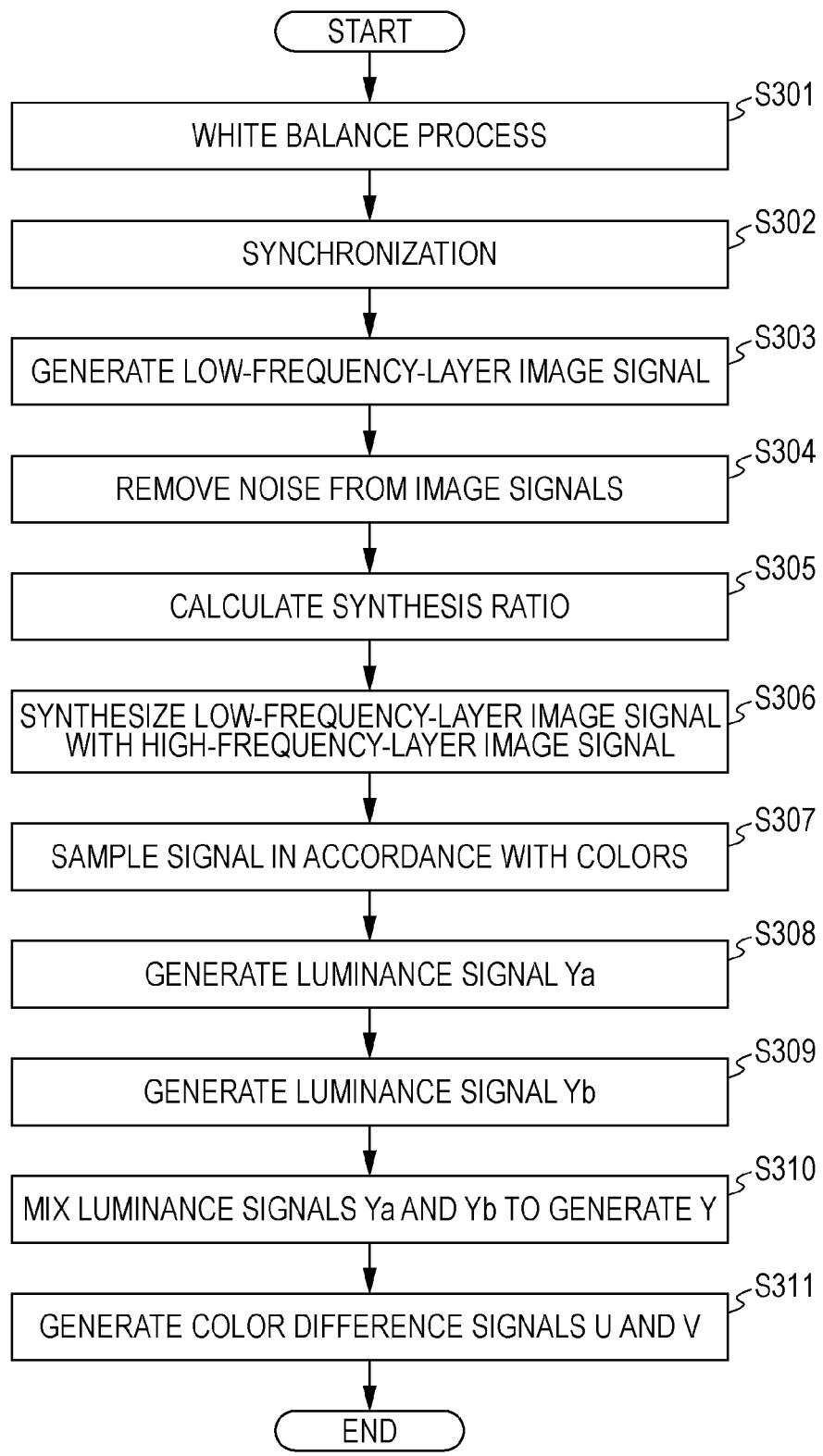
FIG. 3 is a flowchart illustrating a process performed by the image processing circuit.

FIG. 3 is a flowchart illustrating a process performed by the white balance circuit 201, the band processing circuit 202, the sampling circuit 203, and the luminance/color generation circuit 204 which are included in the image processing circuit 105. When receiving an image signal output from the A/D converter 104, the image processing circuit 105 performs the process shown in the flowchart of FIG. 3.

In step S301, the white balance circuit 201 performs the white balance process on an image signal supplied from the A/D converter 104. Here, the image signal is configured by a RAW format, and a single pixel has one of signals corresponding to colors R, G, and B. The white balance circuit 201 calculates gain coefficients for individual color signals so that levels of the R, G, and B signals for a white object are substantially the same as one another. Note that the gain coefficients are calculated using a general method, and therefore, a detailed description thereof is omitted.

Figure 4:
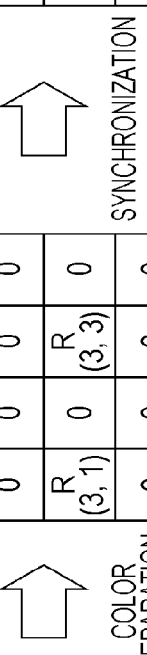
FIG. 4 is a diagram illustrating a synchronization process performed by a synchronization circuit.

In step S302, the synchronization circuit 205 performs a synchronization process on the image signal output from the white balance circuit 201. FIG. 4 is a diagram illustrating the synchronization process performed by a synchronization circuit 205.

The image signal of the Bayer arrangement which has the RAW format and which is output from the white balance circuit 201 is supplied to the synchronization circuit 205 which divides the image signal having the RAW format into image signals for individual colors. Specifically, the synchronization circuit 205 generates an image signal corresponding to a G signal obtained by inserting 0 into signals of pixels other than G pixels, an image signal corresponding to an R signal obtained by inserting 0 into signals of pixels other than R pixels, and an image signal corresponding to a B signal obtained by inserting 0 into signals of pixels other than B pixels.

Subsequently, the synchronization circuit 205 performs the synchronization process on the image signals corresponding to the G, R, and B signals so that each of pixels has the G, R, and B signals. For example, in the image signal corresponding to the R signal, assuming that a signal at a coordinate (m, n) which has not been compensated for is represented by R(m, n) and the signal at the coordinate (m, n) which has been compensated for is represented by $R_P(m, n)$, the signal $R_P(m, n)$ which has been compensated for is calculated in accordance with Expression (1) to Expression (4).

$$R_P(1,1)=R(1,1) \quad (1)$$

$$R_P(1,2)=\{R(1,1)+R(1,3)\}/2 \quad (2)$$

$$R_P(2,1)=\{R(1,1)+R(3,1)\}/2 \quad (3)$$

$$R_P(2,2)=\{R(1,1)+R(1,3)+R(3,1)+R(3,3)\}/4 \quad (4)$$

Similarly, in the image signal corresponding to the B signal, a signal $B_P(m, n)$ which has been compensated for is calculated in the same way.

Furthermore, in the image signal corresponding to the G signal, a signal $G_P(m, n)$ which has been compensated for is calculated in accordance with Expression (5) to Expression (8).

$$G_P(2,2)=\{G(1,2)+G(3,2)+G(2,1)+G(2,3)\}/4 \quad (5)$$

$$G_P(2,3)=G(2,3) \quad (6)$$

$$G_P(3,2)=G(3,2) \quad (7)$$

$$G_P(3,3)=\{G(2,3)+G(4,3)+G(3,2)+G(3,4)\}/4 \quad (8)$$

In step S303, the reduction circuit 208 receives an image signal corresponding to the $G_P$ signal, an image signal corresponding to the $R_P$ signal, and an image signal corresponding to the $B_P$ signal and generates an image signal of a lower band using these image signals.

The reduction circuit 208 performs the V-LPF process and the H-LPF process using a filter coefficient represented by [1, 2, 1] on the image signals corresponding to the $G_P$ signal, the $R_P$ signal, and the $B_P$ signal. Thereafter, the reduction circuit 208 performs the downsampling process on the image signals which have been subjected to the LPF processes so that the numbers of pixels in the horizontal and vertical directions are reduced by half to thereby generate image signals corresponding to a $G_{P1}$ signal, an $R_{P1}$ signal, and a $B_{P1}$ signal. The image signals corresponding to the $G_P$ signal, the $R_P$ signal, and the $B_P$ signal which have not been subjected to the downsampling process are referred to as high-frequency-layer image signals whereas the image signals corresponding to the $G_{P1}$ signal, the $R_{P1}$ signal, and the $B_{P1}$ signal which have been subjected to the downsampling process are referred to as low-frequency-layer image signals.

In this embodiment, the highest frequency band of the low-frequency-layer image signals corresponds to half of the highest frequency of the high-frequency-layer image signals. A lower frequency band of the high-frequency-layer image signals overlaps with a frequency band of the low-frequency-layer image signals.

Note that the reduction circuit 208 may generate the low-frequency-layer image signals by reducing the number of the image signals of the Bayer arrangement which have the RAW format and which are output from the white balance circuit 201 and thereafter performing the LPF processes on a reduced number of image signals without using the synchronization circuit 205.

In step S304, the noise suppression circuit 206 performs the noise suppression process on the high-frequency-layer image signals whereas the noise suppression circuit 209 performs the noise suppression process on the low-frequency-layer image signals. The processes performed by the noise suppression circuits 206 and 209 are the same as each other, and therefore, only the noise suppression process performed by the noise suppression circuit 206 will be described as an example.

The noise suppression circuit 206 performs the noise suppression process using target signals of the individual color signals and surrounding pixels including ranges of matrices of 5×5 pixels with the target pixels as centers.

When an image signal corresponding to the $G_P$ signal is taken as an example, the noise suppression circuit 206 calculates absolute values of differences between a signal level of a target pixel and signal levels of surrounding pixels and compares resultant values with a threshold value. Specifically, assuming that the signal level of the target pixel is denoted by $G_P(s, t)$, the signal levels of the surrounding pixels are denoted by $G_P(i, j)$, and the threshold value is denoted by TH, the signal levels $G_P(i, j)$ which satisfy Expression (9) is obtained.

$$|G_P(i,j)-G_P(s,t)|<TH (\text{note}: s-2 \leq i \leq s+2, t-2 \leq j \leq t+2) \quad (9)$$

Then, the signal levels $G_P(i, j)$ which satisfy Expression (9) are extracted, a value of the luminance signal (s, t) of the target pixel is replaced by an average value of the signal levels $G_P(i, j)$. The noise suppression circuit 206 performs similar processes on the high-frequency-layer image signals corresponding to the $R_P$ signal and the $B_P$ signal.

The noise suppression circuit 206 suppresses noise of the high-frequency-layer image signals by performing the processes performed on the $G_P$ signal, the $R_P$ signal, and the $B_P$ signal on all the pixels. Note that since the range of a matrix of 5×5 is not allowed to be set in edge portions of the image signal, a method for setting surrounding pixels is appropriately changed for such a pixel in order to perform the noise suppression process.

The noise suppression circuit 209 also suppresses noise of the low-frequency-layer image signals by performing the similar process on the $G_{P1}$ signal, the $R_{P1}$ signal, and the $B_{P1}$ signal corresponding to the low-frequency-layer image signals. It is apparent that the method for suppressing noise is not limited to this, and various general methods for suppressing noise may be employed.

Then, the low-frequency-layer image signals which have been subjected to the noise suppression process by the noise suppression circuit 209 are output to the enlargement circuit 210. The enlargement circuit 210 performs an upsampling process on the low-frequency-layer image signals which have been subjected to the noise suppression process so that the number of pixels of each of the low-frequency-layer image signals becomes equal to the number of pixels of a corresponding one of the high-frequency-layer image signals. Specifically, the number of pixels of each of the low-frequency-layer image signals is increased by double and signals of pixels newly generated are set to 0. Thereafter, the enlargement circuit 210 performs linear compensation on the pixels having the values of 0 using values of surrounding pixels so that the pixels at all positions have signals. These processes are separately performed on the $G_{P1}$ signals, the $R_{P1}$ signals, and the $B_{P1}$ signals.

Figure 5:
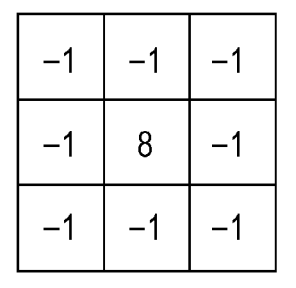
Figure 6:
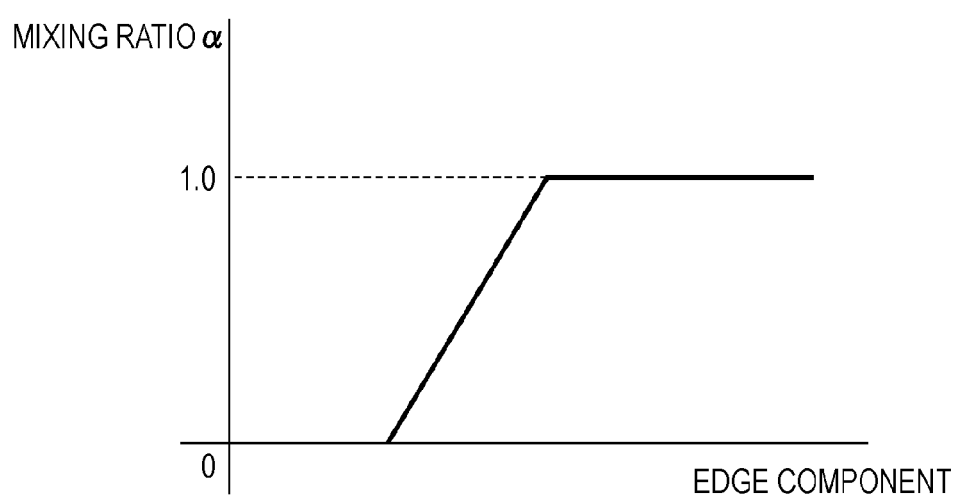
FIG. 6 is a diagram illustrating a mixing ratio $\alpha$ of a high-frequency-layer image signal in an edge component.

In step S305, the synthesis ratio calculation circuit 207 calculates a ratio of synthesis of the high-frequency-layer image signals and the low-frequency-layer image signals. Specifically, the synthesis ratio calculation circuit 207 obtains an edge component of each of the pixels using a filter shown in FIG. 5 in terms of the $G_P$ signals corresponding to the high-frequency-layer image signals. Then, the synthesis ratio calculation circuit 207 reads a mixing ratio α corresponding to the edge component from a memory not shown. FIG. 6 is a diagram illustrating the mixing ratio α of the high-frequency-layer image signals in accordance with the edge component. As shown in FIG. 6, in the synthesis ratio calculation circuit 207, a pixel having a high edge component has a high mixing ratio α so that the mixing ratio of the high-frequency-layer image signals is high whereas a pixel having a low edge component has a low mixing ratio α so that the mixing ratio of the low-frequency-layer image signals is low.

In step S306, the image synthesis circuit 211 synthesizes the $G_P$ signal corresponding to the high-frequency-layer image signal with the $G_{P1}$ signal corresponding to the low-frequency-layer image signal using the mixing ratio α obtained by the synthesis ratio calculation circuit 207 so as to newly obtain a G signal. Specifically, in each of the pixels, the $G_P$ signal corresponding to the high-frequency-layer image signal which has been subjected to the noise suppression process by the noise suppression circuit 206 and the $G_{P1}$ signal corresponding to the low-frequency-layer image signal which has been subjected to the enlargement process by the enlargement circuit 210 are added to each other in accordance with Expression (10).

$$G = \alpha \times G_P + (1-\alpha) \times G_{P1} \quad (10)$$

Similarly, in each of the pixels, the $R_P$ signal and the $B_P$ signal corresponding to the high-frequency-layer image signals which have been subjected to the noise suppression process by the noise suppression circuit 206 and the $R_{P1}$ signal and the $B_{P1}$ signal corresponding to the low-frequency-layer image signals which have been subjected to the enlargement process by the enlargement circuit 210 are added to each other in accordance with Expression (11) and Expression (12), respectively.

$$R = \alpha \times R_P + (1-\alpha) \times R_{P1} \quad (11)$$

$$B = \alpha \times B_P + (1-\alpha) \times B_{P1} \quad (12)$$

Then, the G, R, and B signals which are obtained after the additions and which are output from the image synthesis circuit 211 are supplied to the sampling circuit 203.

In step S307, the sampling circuit 203 performs sampling on the G, R, and B signals in accordance with the Bayer arrangement so as to generate a single image signal in accordance with the Bayer arrangement. Specifically, the sampling circuit 203 generates an image signal having a pattern in which a matrix of 2×2 signals, i.e., four signals, configured such that an R signal and a B signal are diagonally arranged in two pixels and G signals are diagonally arranged in remaining two pixels is repeated. Then, the sampling circuit 203 supplies the image signal which is obtained by sampling and which is regenerated in accordance with the Bayer arrangement to the first luminance signal generation circuit 212, the second luminance signal generation circuit 213, and the color generation circuit 215.

Figure 7:
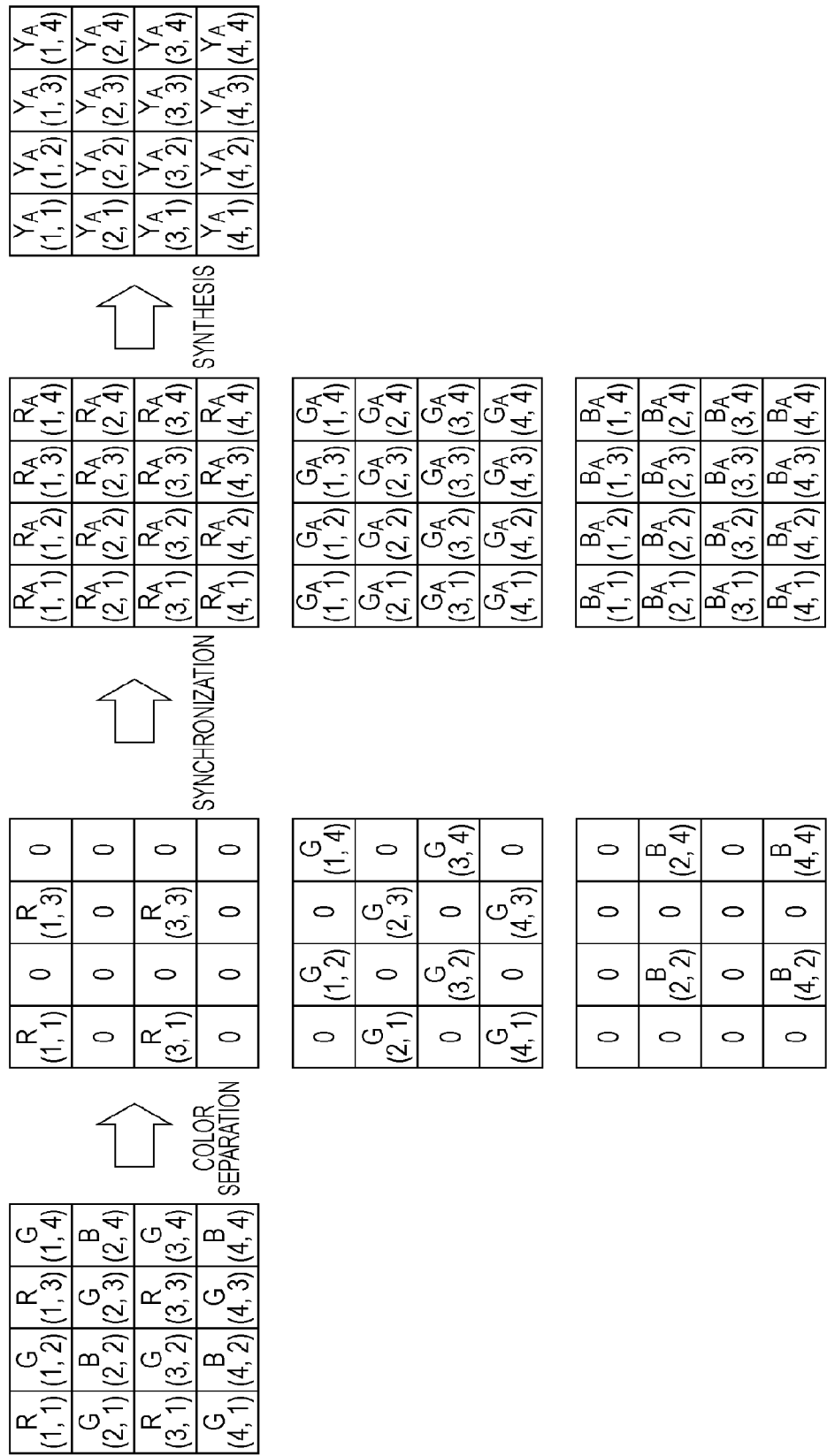
FIG. 7 is a diagram illustrating a process of generating a first luminance signal $Y_A$ performed by a first luminance signal generation circuit.

Subsequently, in step S308, the first luminance signal generation circuit 212 generates a first luminance signal $Y_A$. FIG. 7 is a diagram illustrating a process of generating the first luminance signal $Y_A$ performed by the first luminance signal generation circuit 212.

The first luminance signal generation circuit 212, as shown in FIG. 7, divides the image signal supplied from the sampling circuit 203 into image signals of the individual colors and performs a compensation process so as to generate color signals in individual pixels whereby a synchronization process is performed.

For example, in an image signal corresponding to an R signal, assuming that a signal in a coordinate (m, n) which has not been subjected to the compensation process is denoted by R(m, n) and a signal in the coordinate (m, n) which has been subjected to the compensation process is denoted by $R_A$(m, n), the signal $R_A$(m, n) is calculated in accordance with Expression (13) to Expression (16).

$$R_A(1,1)=R(1,1) \quad (13)$$

$$R_A(1,2)=\{R(1,1)+R(1,3)\}/2 \quad (14)$$

$$R_A(2,1)=\{R(1,1)+R(3,1)\}/2 \quad (15)$$

$$R_A(2,2)=\{R(1,1)+R(1,3)+R(3,1)+R(3,3)\}/4 \quad (16)$$

Similarly, in an image signal corresponding to a B signal, a signal $B_A$(m, n) which has been subjected to the compensation process is calculated in the same way.

Furthermore, in an image signal corresponding to a G signal, a signal $G_A$(m, n) which has been subjected to the compensation process is calculated in accordance with Expression (17) to Expression (20).

$$Ga(2,2)=\{G(1,2)+G(3,2)+G(2,1)+G(2,3)\}/4 \quad (17)$$

$$Ga(2,3)=\{4\times G(2,3)+G(1,2)+G(1,4)+G(3,2)+G(3,4)\}/8 \quad (18)$$

$$Ga(3,2)=\{4\times G(3,2)+G(2,1)+G(2,3)+G(4,1)+G(4,3)\}/8 \quad (19)$$

$$Ga(3,3)=\{G(2,3)+G(4,3)+G(3,2)+G(3,4)\}/4 \quad (20)$$

It is apparent that the compensation methods are merely examples, and various other general compensation methods may be employed. For example, in order to suppress degradation of a high band characteristic of an original signal, the correlations of the object for individual directions may be determined in advance and heavy weight may be applied on signals located in a direction corresponding to the highest correlation whereby compensation is performed. Specifically, the correlation between signals of G pixels which are vertically adjacent to a pixel to be compensated for may be compared with the correlation between signals of G pixels which are horizontally adjacent to the pixel to be compensated for. Then, a rate of the signals of the G pixels having the higher correlation may be made large so that a signal $G_A$(m, n) of the pixel to be compensated for is obtained. Alternatively, the signal $G_A$(m, n) of the pixel to be compensated for may be obtained only using the signals of the G pixels corresponding to the higher correlation.

In step S302, the synchronization circuit 205 does not accurately obtain the correlations of the pixels located near the target pixel since noise components are superposed on the pixels shown in FIG. 13. Therefore, a signal of the pixel to be compensated for is obtained by simple linear compensation. On the other hand, the first luminance signal generation circuit 212 performs the compensation process using signals in which noise components are suppressed by the band processing circuit 202. Therefore, the first luminance signal generation circuit 212 performs the compensation process in accordance with the correlations of the pixels located in the vicinity of the pixel to be compensated for.

The $R_A$ signal, the $G_A$ signal, the $B_A$ signal obtained as described above are assigned to Expression (21) so that a first luminance signal $Y_A$(m, n) of a pixel of a coordinate (m, n) is obtained.

$$Y_A(m,n)=0.3\times R_A(m,n)+0.6\times G_A(m,n)+0.1\times B_A(m,n) \quad (21)$$

Then, the first luminance signal generation circuit 212 outputs the obtained first luminance signal $Y_A$ to the luminance mixing circuit 214.

Note that, although the case where the $R_A$ signal, the $G_A$ signal, and the $B_A$ signal are used to obtain the first luminance signal $Y_A$ is taken as an example, the $G_A$ signal may be used as the first luminance signal $Y_A$. Any luminance signal may be used as the first luminance signal $Y_A$ as long as the first luminance signal $Y_A$ is obtained by performing the compensation process on an image signal corresponding to the G signal which is a first color signal.

Figure 8:
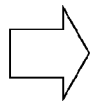
FIG. 8 is a diagram illustrating a process of generating a second luminance signal $Y_B$ performed by a second luminance signal generation circuit.

In step S309, the second luminance signal generation circuit 213 generates a second luminance signal $Y_B$. Unlike the first luminance signal $Y_A$, the second luminance signal $Y_B$ is not generated by distinguishing color signals but is generated by processing signals corresponding to the pixels of all the colors. FIG. 8 is a diagram illustrating a process of generating the second luminance signal $Y_B$ performed by the second luminance signal generation circuit 213.

As shown in FIG. 8, the second luminance signal generation circuit 213 receives the image signal output from the sampling circuit 203. The second luminance signal generation circuit 213 performs the vertical lowpass filter (V-LPF) process and the horizontal lowpass filter (H-LPF) process so as to generate the second luminance signal $Y_B$. In the V-LPF process and the H-LPF process, a filter coefficient represented by [1, 2, 1], for example, may be used. Alternatively, a direction of the filter or the filter coefficient may be changed in accordance with a state of an edge of the image signal or a level of the correlation with the surrounding pixels.

Note that the process to be performed by the second luminance signal generation circuit 213 may be eliminated and the image signal of the RAW format may be used as the second luminance signal $Y_B$. That is, second luminance signals $Y_B$ for individual pixels can be obtained in accordance with Expression (22) to Expression (25).

$$Y_B(1,1)=R(1,1) \quad (22)$$

$$Y_B(1,2)=G(1,2) \quad (23)$$

$$Y_B(2,1)=G(2,1) \quad (24)$$

$$Y_B(2,2)=B(2,2) \quad (25)$$

In step S310, the luminance mixing circuit 214 mixes the first luminance signal $Y_A$ and the second luminance signal $Y_B$ so as to generate a luminance signal Y. Assuming that a mixing ratio of the first luminance signal in the luminance signal Y is denoted by β, the luminance mixing circuit 214 obtains luminance signals for individual pixels by assigning the first luminance signal $Y_A$ and the second luminance signal $Y_B$ in Expression (26).

$$Y=\beta\times Y_A+(1-\beta)\times Y_B \quad (26)$$

Here, in this embodiment, the luminance mixing circuit 214 determines the mixing ratio β of the first luminance signal $Y_A$ in the luminance signal Y in accordance with a saturation S of the object. A method for obtaining the mixing ratio β will be described. As with the first luminance signal generation circuit 212, the luminance mixing circuit 214 divides the image signal of the RAW format into image signals of the individual colors and performs the synchronization. Then, an absolute value of a difference between an R signal and a G signal of each of pixels is added to an absolute value of a difference between a B signal and the G signal of the pixel so that a saturation S of each of the pixels is obtained.

$$S=|R-G|+|B-G| \quad (27)$$

Figure 9:
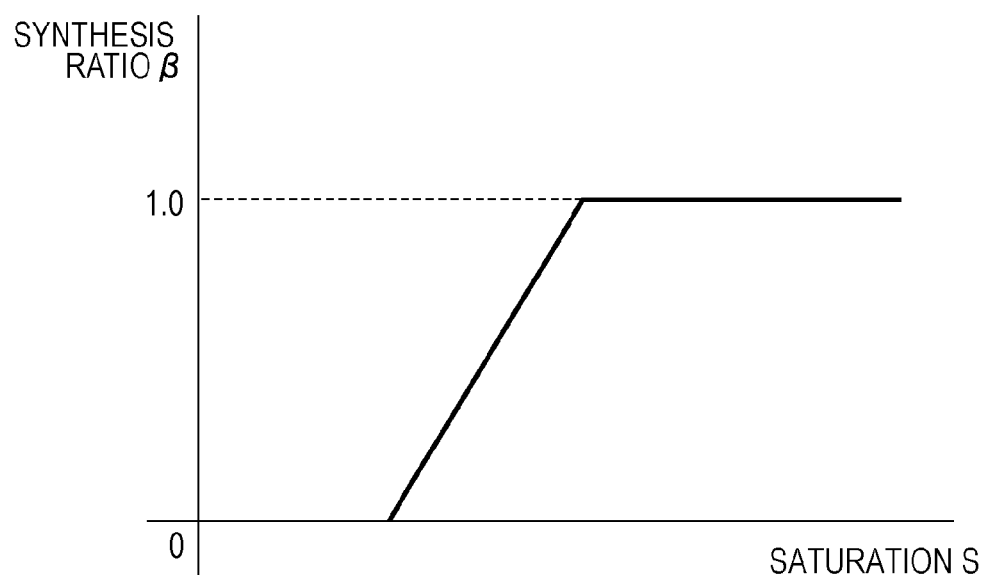
FIG. 9 is a diagram illustrating a mixing ratio $\beta$ of the first luminance signal $Y_A$ in accordance with a saturation S.

The luminance mixing circuit 214 reads the mixing ratio β corresponding to the saturation S from the memory not shown. FIG. 9 is a diagram illustrating the mixing ratio β of the first luminance signal $Y_A$ in accordance with the saturation S. As shown in FIG. 9, the luminance mixing circuit 214 sets the mixing ratio β to be large, that is, the luminance mixing circuit 214 sets a mixing ratio of the first luminance signal $Y_A$ to be large in a case of a pixel having a high saturation whereas the luminance mixing circuit 214 sets the mixing ratio β to be small, that is, the luminance mixing circuit 214 sets a mixing ratio of the second luminance signal $Y_B$ to be large in a case of a pixel having a low saturation.

Note that the method for obtaining a mixing ratio of the first luminance signal $Y_A$ to the second luminance signal $Y_B$ is not limited to this, and a final mixing ratio may be determined by multiplying a mixing ratio obtained using an absolute value of a difference between an R signal and a G signal by a mixing ratio obtained using an absolute value of a difference between a B signal and the G signal. Furthermore, instead of the process of adding and synthesizing the first luminance signal $Y_A$ and the second luminance signal $Y_B$ with each other, one of the first luminance signal $Y_A$ and the second luminance signal $Y_B$ which corresponds to a higher mixing ratio may be selected. Alternatively, in a case where a region in which it is determined that the diagonal correlation is higher than the threshold value is detected, the second luminance signal $Y_B$ may be used only for the region. Furthermore, since a configuration ratio of colors included in a high frequency component of the first luminance signal $Y_A$ is different from that of the second luminance signal $Y_B$, when a certain color of the object is strong, a value of the first luminance signal $Y_A$ and a value of the second luminance signal $Y_B$ is considerably different from each other. Therefore, a low frequency component of the first luminance signal $Y_A$ and a high frequency component of the second luminance signal $Y_B$ may be obtained and synthesized with each other so that a luminance signal is obtained, and the obtained luminance signal and the first luminance signal $Y_A$ may be mixed with each other with the mixing ratio described above.

In step S311, the color generation circuit 215 generates color difference signals U and V using the R, G, and B signals output from the sampling circuit 203. The color generation circuit 215 performs a color compensation process, a fake color removing process, a matrix conversion process, and the like on the R, G, and B signals so as to generate the color difference signals U and V. The color difference signals U and V may be generated by a general method, and therefore, a detailed description of the method is omitted.

By performing the processes, the luminance signal Y in which the aliasing is suppressed and the color difference signals U and V are generated in the luminance/color generation circuit 204.

As described above, according to the configuration of this embodiment, the band processing circuit 202 executes the noise suppression process by dividing an image signal according to a plurality of bands, and the luminance/color generation circuit 204 executes the process of suppressing the aliasing.

Note that although the case where only low-frequency-layer image signals in a single layer is generated has been taken as an example, the present invention is not limited to this. A plurality of reduction circuits 208, a plurality of noise suppression circuits 209, and a plurality of enlargement circuits 210 may be provided, the noise suppression process may be performed on individual low-frequency-layer image signals which are multilayered according to frequency bands, and the low-frequency-layer image signals may be synthesized with one another by the image synthesis circuit 211.

Furthermore, a method of the noise suppression process performed on the high-frequency-layer image signals and a method of the noise suppression process performed on the low-frequency-layer image signals may be different from each other. For example, the high-frequency-layer image signals may be subjected to the noise suppression process in the way described in step S304 whereas the low-frequency-layer image signals may be subjected to a noise suppression process including the V-LPF process and the H-LPF process.

Alternatively, if the reduction circuit 208 has performed a noise suppression process such as the LPF processes when the reduction circuit 208 generates low-frequency-layer image signals, the noise suppression circuit 209 which processes low-frequency-layer image signals may be eliminated.

Second Embodiment

Next, a second embodiment of the present invention will be described. In the first embodiment, an image signal having a frequency band lower than that of an original image signal is generated by the band processing circuit 202. However, in this embodiment, an original image signal is divided into a plurality of frequency components corresponding to different frequency bands which do not overlap with one another.

Figure 10:
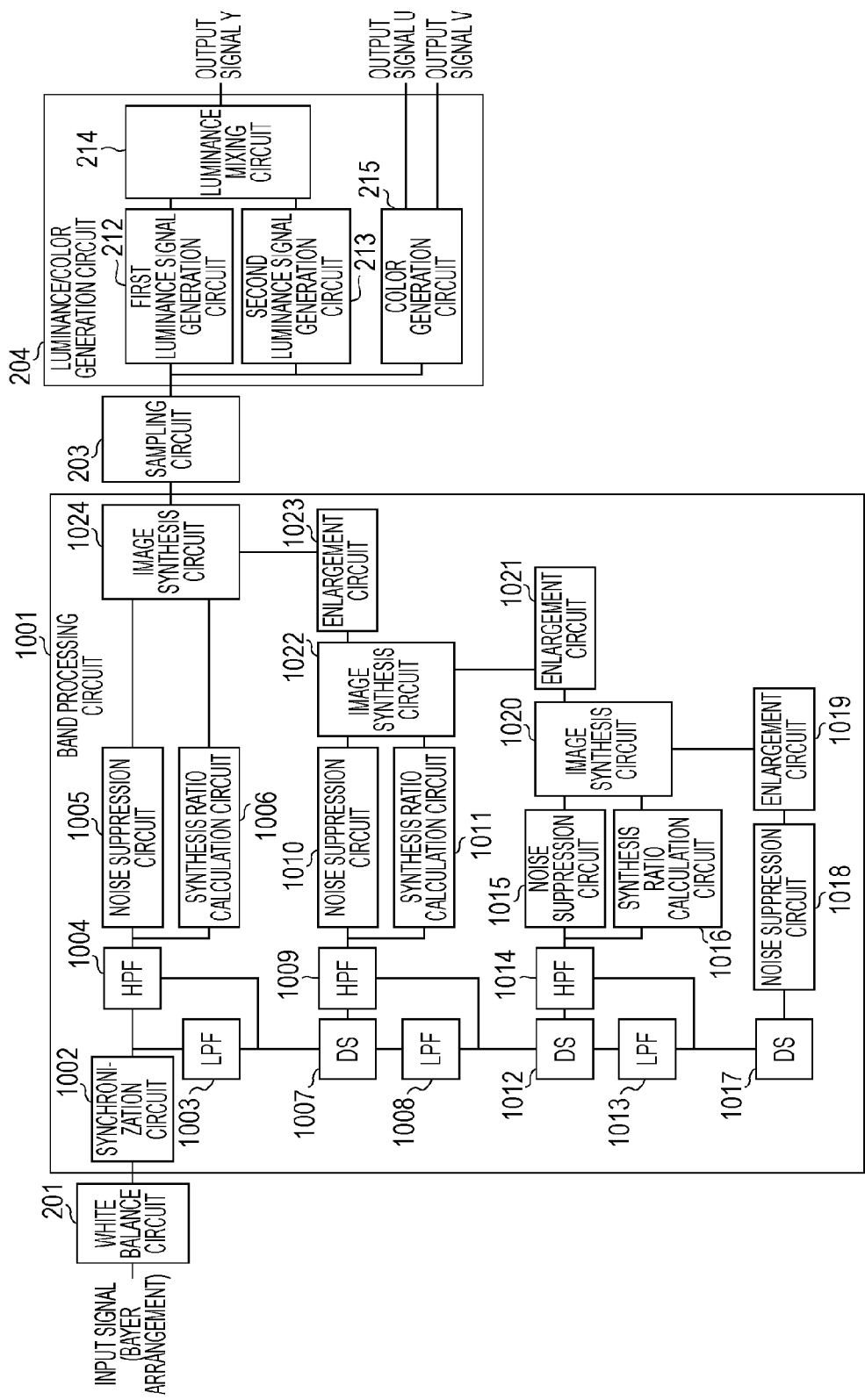
FIG. 10 is a diagram schematically illustrating a portion of a configuration of an image processing circuit according to a second embodiment of the present invention.

FIG. 10 is a diagram schematically illustrating another configuration of the image processing circuit 105 according to a second embodiment of the present invention. In FIG. 10, circuits having configurations the same as those shown in FIG. 2 are denoted by reference numerals the same as those shown in FIG. 2. The image processing circuit 105 of this embodiment includes a white balance circuit 201, a band processing circuit 1001, a sampling circuit 203, and a luminance/color generation circuit 204.

A synchronization circuit 1002 included in the band processing circuit 1001 performs the same synchronization processing as the synchronization circuit 205 on an image signal output from the white balance circuit 201 so as to generate an image signal corresponding to a $G_P$ signal, an image signal corresponding to an $R_P$ signal, and an image signal corresponding to a $B_P$ signal. In each of image signals, each of pixels output from the synchronization circuit 1002 includes the $G_P$ signal, the $R_P$ signal, and the $B_P$ signal.

The image signals corresponding to the $G_P$ signal, the $R_P$ signal, and the $B_P$ signal are supplied to a lowpass filter (LPF) 1003 and a highpass filter (HPF) 1004.

As with the reduction circuit 208 shown in FIG. 2, the lowpass filter 1003 performs a V-LPF process and an H-LPF process on the $G_P$ signal, the $R_P$ signal, and the $B_P$ signal so as to generate a $G_{PL}$ signal, an $R_{PL}$ signal, and a $B_{PL}$ signal.

The highpass filter 1004 subtracts the $G_{PL}$ signal, the $R_{PL}$ signal, and the $B_{PL}$ signal which are generated by the lowpass filter 1003 from the $G_P$ signal, the $R_P$ signal, and the $B_P$ signal which are output from the synchronization circuit 1002. As a result, the highpass filter 1004 extracts a $G_{PH}$ signal, an $R_{PH}$ signal, and a $B_{PH}$ signal which are high frequency components of the $G_P$ signal, the $R_P$ signal, and the $B_P$ signal, respectively.

The $G_{PH}$ signal, the $R_{PH}$ signal, and the $B_{PH}$ signal are supplied to a noise suppression circuit 1005 which performs the same noise suppression process as the noise suppression circuit 206 shown in FIG. 2. Furthermore, the $G_{PH}$ signal, the $R_{PH}$ signal, and the $B_{PH}$ signal are supplied to a synthesis ratio calculation circuit 1006 where a synthesis ratio is calculated in the same way as the synthesis ratio calculation circuit 207 shown in FIG. 2.

The $G_{PL}$ signal, the $R_{PL}$ signal, and the $B_{PL}$ signal which are generated by the lowpass filter 1003 are supplied to a downsampling (DS) circuit 1007. The DS circuit 1007 performs a downsampling process on the $G_{PL}$ signal, the $R_{PL}$ signal, and the $B_{PL}$ signal so that the numbers of pixels in horizontal and vertical directions are reduced by half whereby a $G_{P1}$ signal, a $P_{R1}$ signal, and a $B_{P1}$ signal are generated.

The $G_{P1}$ signal, the $R_{P1}$ signal, and the $B_{P1}$ signal output from the DS circuit 1007 are supplied to an LPF 1008 and an HPF 1009.

As with the reduction circuit 208 shown in FIG. 2, the LPF 1008 performs the V-LPF process and the H-LPF process on the $G_{P1}$ signal, the $R_{P1}$ signal, and the $B_{P1}$ signal so as to generate a $G_{PL1}$ signal, a $R_{PL1}$ signal, and a $B_{PL1}$ signal.

The HPF 1009 subtracts the $G_{PL1}$ signal, the $R_{PL1}$ signal, and the $B_{PL1}$ signal which are generated by the LPF 1008 from the $G_{P1}$ signal, the $R_{P1}$ signal, and the $B_{P1}$ signal which are output from the DS circuit 1007. As a result, the HPF 1009 extracts a $G_{PH1}$ signal, an $R_{PL1}$ signal, and a $B_{PH1}$ signal which are high frequency components of the $G_{P1}$ signal, the $R_{P1}$ signal, and the $B_{P1}$ signal.

The $G_{PH1}$ signal, the $R_{PH1}$ signal, and the $B_{PH1}$ signal are supplied to a noise suppression circuit 1010 where the same noise suppression process as the noise suppression circuit 206 shown in FIG. 2 is performed. Furthermore, the $G_{PH1}$ signal, the $R_{PH1}$ signal, and the $B_{PH1}$ signal are supplied to a synthesis ratio calculation circuit 1011 where a synthesis ratio is calculated in the same way as the synthesis ratio calculation circuit 207 shown in FIG. 2.

The $G_{PL1}$ signal, the $R_{PL1}$ signal, and the $B_{PL1}$ signal which are generated by the LPF 1008 are supplied to a DS circuit 1012. The DS circuit 1012 performs a downsampling process on the $G_{PL1}$ signal, the $R_{PL1}$ signal, and the $B_{PL1}$ signal so that the numbers of pixels in horizontal and vertical directions are reduced by half whereby a $G_{P2}$ signal, a $P_{R2}$ signal, and a $B_{P2}$ signal are generated.

The $G_{P2}$ signal, the $R_{P2}$ signal, the $B_{P2}$ signal which are output from the DS circuit 1012 are supplied to an LPF 1013 and an HPF 1014. As with the reduction circuit 208 shown in FIG. 2, the LPF 1013 performs the V-LPF process and the H-LPF process on the $G_{P2}$ signal, the $R_{P2}$ signal, and the $B_{P2}$ signal so as to generate a $G_{PL2}$ signal, an $R_{PL2}$ signal, and a $B_{PL2}$ signal.

The HPF 1014 subtracts the $G_{PL2}$ signal, the $R_{PL2}$ signal, and the $B_{PL2}$ signal which are generated by the LPF 1013 from the $G_{P2}$ signal, the $R_{P2}$ signal, and the $B_{P2}$ signal which are output from the DS circuit 1012. As a result, the HPF 1014 extracts a $G_{PH2}$ signal, an $R_{PH2}$ signal, and a $B_{PH2}$ signal which are high frequency components of the $G_{P2}$ signal, the $R_{P2}$ signal, and the $B_{P2}$ signal.

The $G_{PH2}$ signal, the $R_{PH2}$ signal, and the $B_{PH2}$ signal are supplied to a noise suppression circuit 1015 where the same noise suppression process as the noise suppression circuit 206 shown in FIG. 2 is performed. Furthermore, the $G_{PH2}$ signal, the $R_{PH2}$ signal, and the $B_{PH2}$ signal are supplied to a synthesis ratio calculation circuit 1016 where a synthesis ratio is calculated in the same way as the synthesis ratio calculation circuit 207 shown in FIG. 2.

The $G_{PL2}$ signal, the $R_{PL2}$ signal, and the $B_{PL2}$ signal which are generated by the LPF 1013 are supplied to a DS circuit 1017. The DS circuit 1017 performs a downsampling process on the $G_{PL2}$ signal, the $R_{PL2}$ signal, and the $B_{PL2}$ signal so that the numbers of pixels in horizontal and vertical directions are reduced by half whereby a $G_{P3}$ signal, a $P_{R3}$ signal, and a $B_{P3}$ signal are generated.

The $G_{P3}$ signal, the $R_{P3}$ signal, and the $B_{P3}$ signal are supplied to a noise suppression circuit 1018 where the same noise suppression process as the noise suppression circuit 206 shown in FIG. 2 is performed.

Frequency bands of the $G_{PH}$ signal, the $G_{PH1}$ signal, the $G_{PH2}$ signal, and the $G_{P3}$ signal are not superposed with one another, and the frequency bands are lowered from the $G_{PH}$ another, and the frequency bands are lowered from the $G_{PH}$ signal to the $G_{P3}$ signal. Frequency bands of the $R_{PH}$ signal to the $R_{P3}$ signal and frequency bands of the $B_{PH}$ signal to the $B_{P3}$ signal are similarly lowered.

An enlargement circuit 1019 performs upsampling process on the individual signals supplied from the noise suppression circuit 1018 so that the numbers of pixels corresponding to the signals supplied from the noise suppression circuit 1018 are equal to the numbers of pixels output from the noise suppression circuit 1015. An image synthesis circuit 1020 synthesizes the signals output from the enlargement circuit 1019 with the signals output from the noise suppression circuit 1015 for individual colors by the same method as the image synthesis circuit 211 shown in FIG. 2 using the synthesis ratio obtained by the synthesis ratio calculation circuit 1016.

An enlargement circuit 1021 performs an upsampling process on the signals output from the image synthesis circuit 1020 so that the numbers of pixels corresponding to the signals output from the image synthesis circuit 1020 are equal to the numbers of pixels output from the noise suppression circuit 1010. An image synthesis circuit 1022 synthesizes the signals output from the enlargement circuit 1021 with the signals output from the noise suppression circuit 1010 for individual colors by the same method as the image synthesis circuit 211 shown in FIG. 2 using the synthesis ratio obtained by the synthesis ratio calculation circuit 1011.

Furthermore, an enlargement circuit 1023 performs an upsampling process on the signals output from the image synthesis circuit 1022 so that the numbers of pixels corresponding to the signals output from the image synthesis circuit 1022 are equal to the numbers of pixels output from the noise suppression circuit 1005. An image synthesis circuit 1024 synthesizes the signals output from the enlargement circuit 1023 with the signals output from the noise suppression circuit 1005 for individual colors by the same method as the image synthesis circuit 211 shown in FIG. 2 using the synthesis ratio obtained by the synthesis ratio calculation circuit 1006.

That is, the processes performed by the LPFs 1003, 1008, and 1013, and the DS circuits 1007, 1012, and 1017 correspond to the process performed in step S303 shown in FIG. 3, and the processes performed by the noise suppression circuits 1005, 1010, 1015, and 1018 correspond to the process performed in step S304 shown in FIG. 3. Furthermore, the processes performed by the synthesis ratio calculation circuits 1006, 1011, and 1016 correspond to the process performed in step S305 shown in FIG. 3, and the processes performed by the enlargement circuits 1019, 1021, and 1023 and the image synthesis circuits 1020, 1022, and 1024 correspond to the process performed in step S306 shown in FIG. 3.

Then, the image signals corresponding to the G signal, the R signal, and the B signal output from the image synthesis circuit 1024 are subjected to a sampling process performed by the sampling circuit 203 in accordance with the Bayer arrangement, and the image signals which have been subjected to the sampling process are supplied to the luminance/color generation circuit 204.

As described above, even when the band processing circuit is configured such that the noise suppression process is performed after the original image signal is divided into a plurality of frequency components corresponding to different frequency bands which do not overlap with one another, the same advantage as the first embodiment can be attained.

Third Embodiment

Next, a third embodiment of the present invention will be described. This embodiment is different from the first embodiment in that a size of an image signal output from an image processing circuit 105 can be changed (resized) and different methods for generating a luminance signal Y are used depending on sizes of the output image signal.

Figure 11:
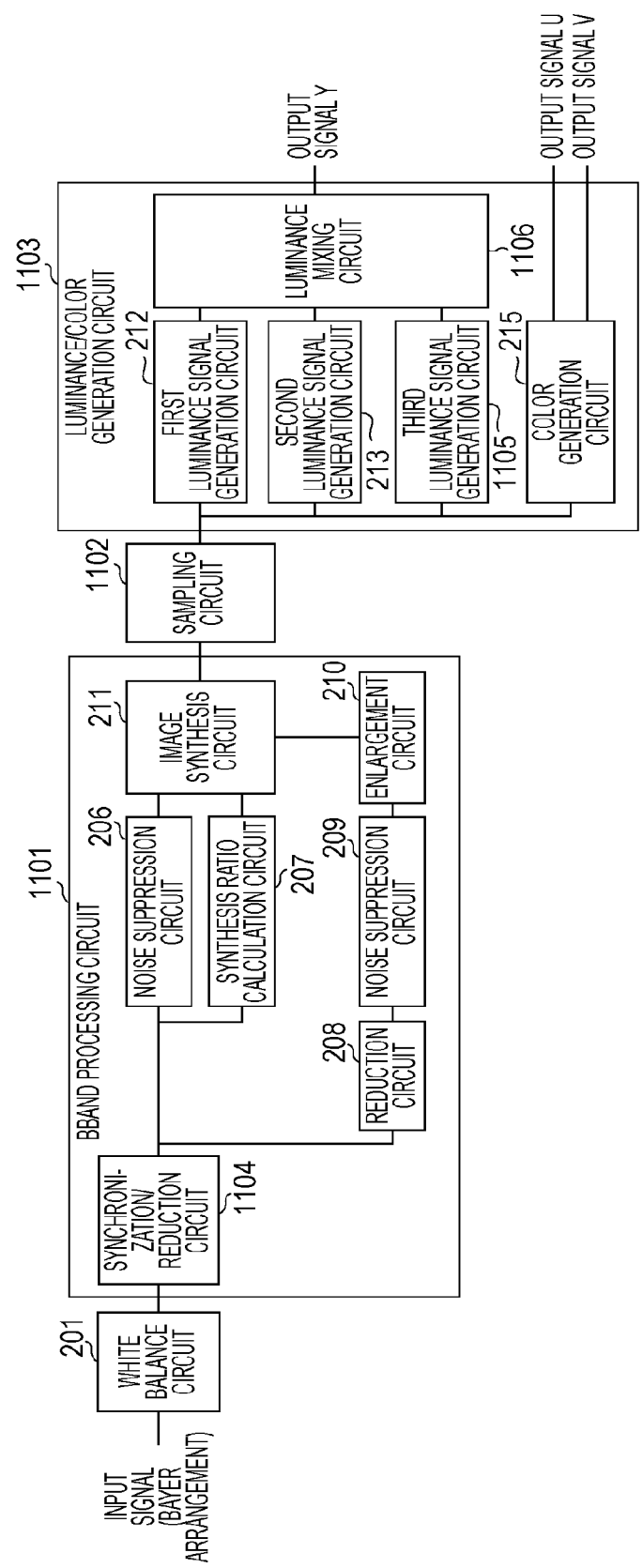
FIG. 11 is a diagram schematically illustrating a portion of a configuration of an image processing circuit according to a third embodiment of the present invention.

FIG. 11 is a diagram schematically illustrating a portion of a configuration of the image processing circuit 105. In FIG. 11, circuits having configurations the same as those shown in FIG. 2 are denoted by reference numerals the same as those shown in FIG. 2. The image processing circuit 105 in this embodiment includes a white balance circuit 201, a band processing circuit 1101, a sampling circuit 1102, and a luminance/color generation circuit 1103.

The band processing circuit 1101 includes a synchronization/reduction circuit 1104 instead of the synchronization circuit 205 shown in FIG. 2. In the first and second embodiments, the number of pixels corresponding to an image signal input to the image processing circuit 105 is equal to the number of pixels corresponding to an image signal output from the image processing circuit 105. However, in this embodiment, the number of pixels of an image signal output from the image processing circuit 105 may be reduced relative to the number of pixels of an image signal input to the image processing circuit 105 using the synchronization/reduction circuit 1104. A user may specify a size of an image signal to be output using an operation member 110. A control circuit 106 instructs the synchronization/reduction circuit 1104 to change the size of the image signal output from the image processing circuit 105 in accordance with the size specified by the user.

Furthermore, the sampling circuit 1102 determines whether a process of sampling a G signal, an R signal, and a B signal from the image signal output from the image synthesis circuit 211 in accordance with the Bayer arrangement, i.e., a re-Bayer arrangement process, is to be performed in accordance with operation of the synchronization/reduction circuit 1104.

Furthermore, the luminance/color generation circuit 1103 includes a third luminance signal generation circuit 1105 and a luminance mixing circuit 1106 instead of the luminance mixing circuit 214 shown in FIG. 2. The luminance/color generation circuit 1103 switches the methods for generating a luminance signal Y from one to another in accordance with an operation of the synchronization/reduction circuit 1104.

Figure 12:
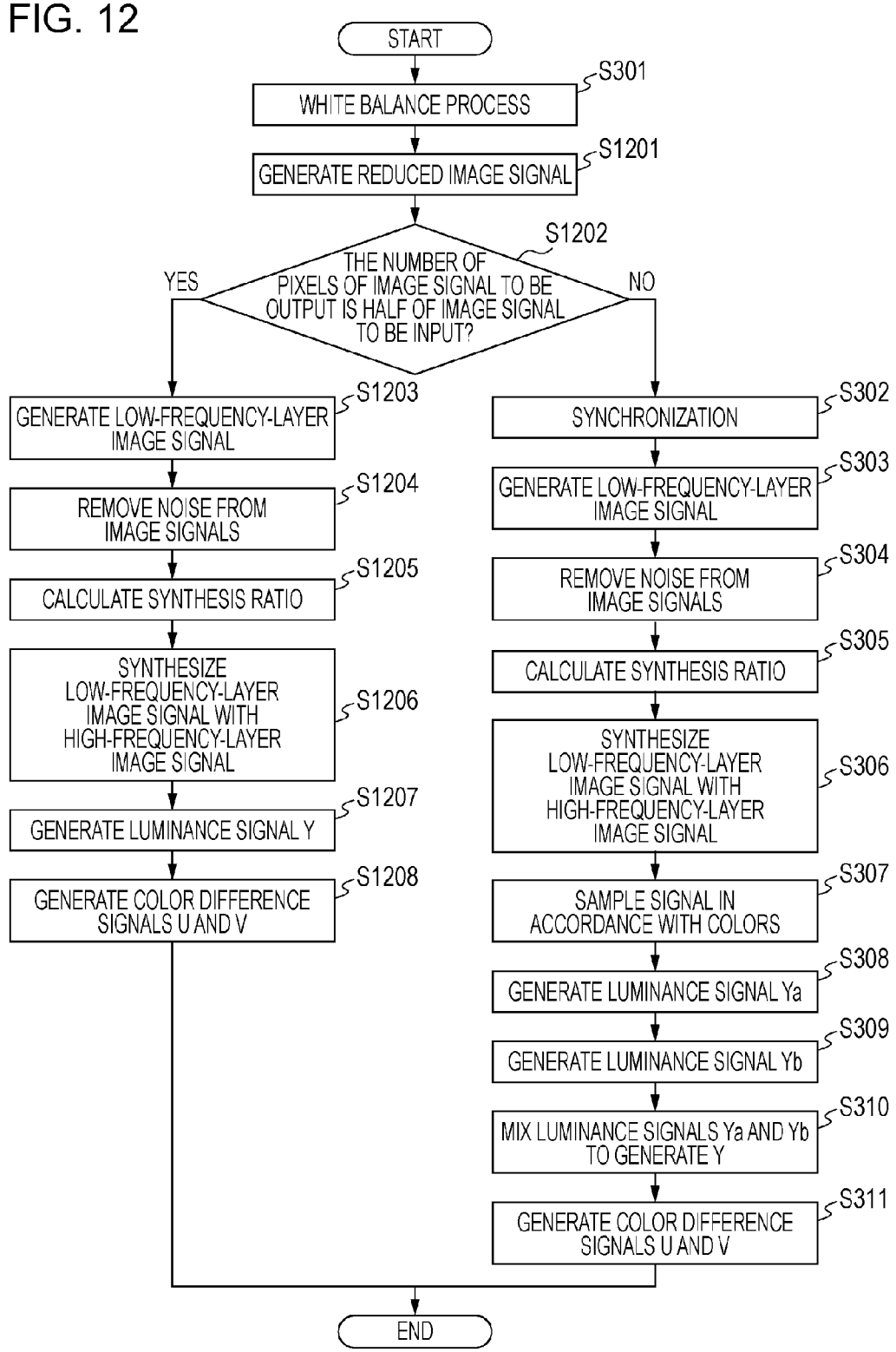
FIG. 12 is a flowchart illustrating a process performed by the image processing circuit shown in FIG. 11.
Figure 14:
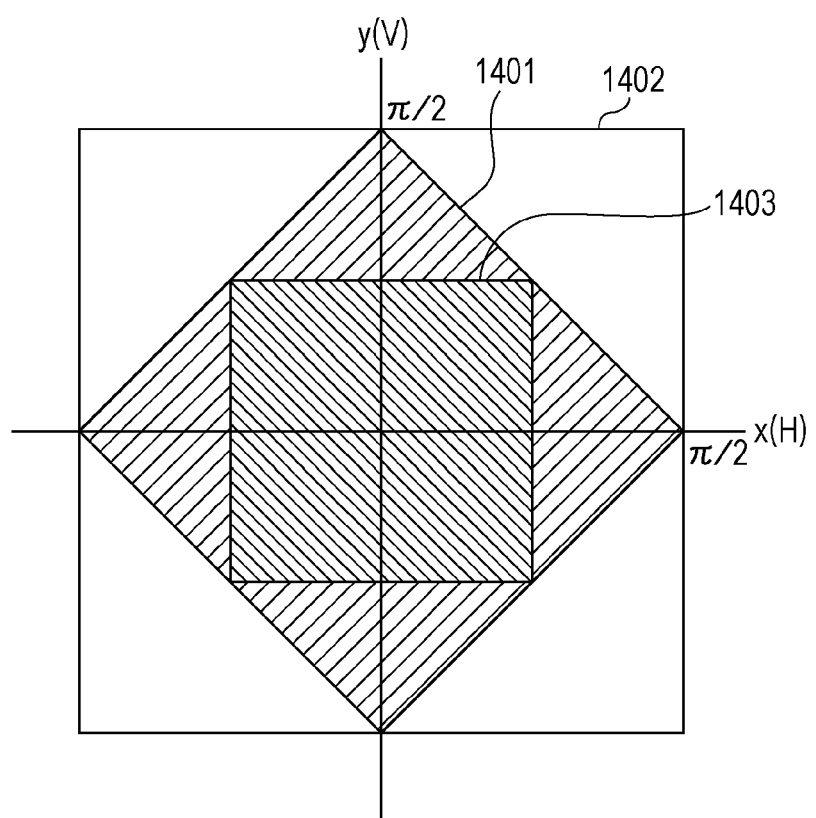
FIG. 14 is a diagram illustrating spatial frequency characteristics in which first and second luminance signals can be resolved.
Figure 15:
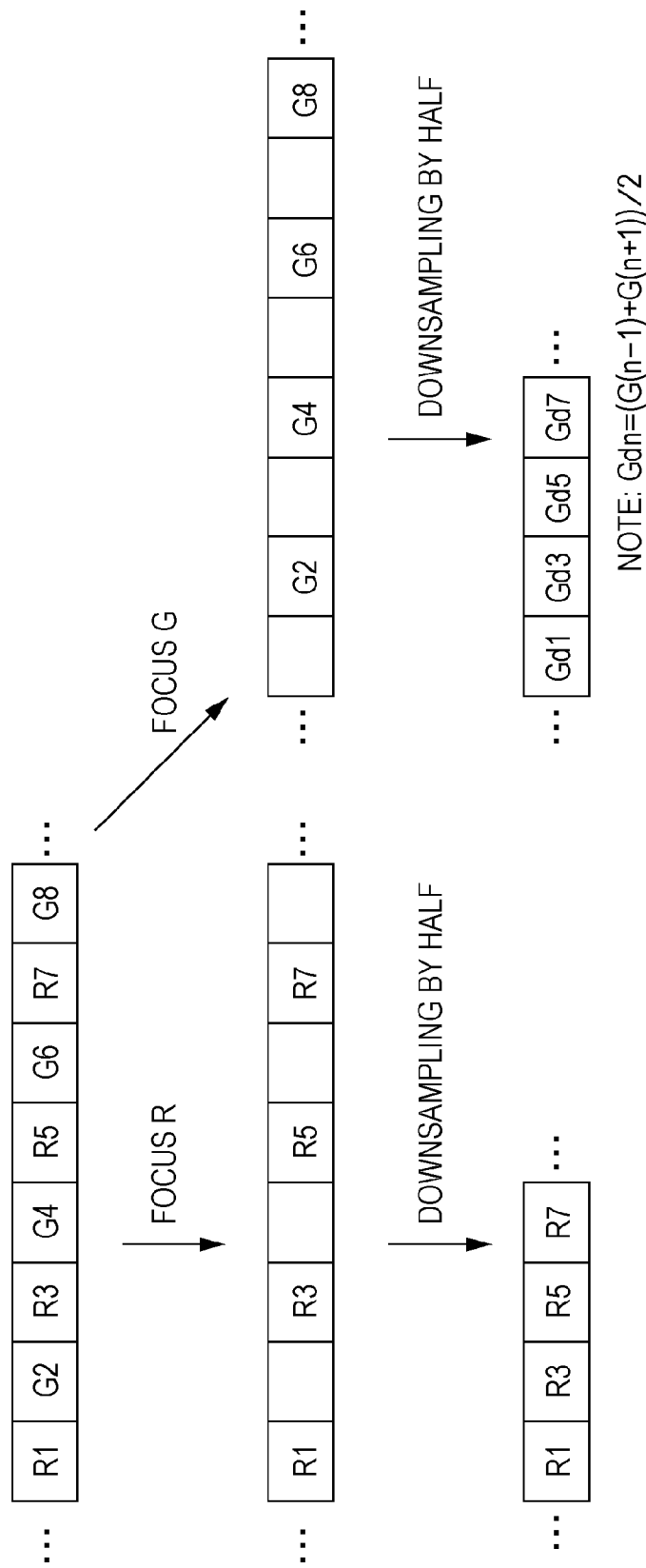
FIG. 15 is a diagram illustrating a case where each pixel which has been subjected to a downsampling process has all color signals.

FIG. 12 is a flowchart illustrating a process performed by the white balance circuit 201, the band processing circuit 1101, the sampling circuit 1102, and the luminance/color generation circuit 1103 included in the image processing circuit 105. When receiving an image signal output from the A/D converter 104, the image processing circuit 105 performs the process of the flowchart shown in FIG. 12. Note that, in the flowchart shown in FIG. 12, processes the same as those shown in FIG. 3 are denoted by step numbers the same as those shown in FIG. 3.

In step S301, the white balance circuit 201 performs a white balance process on an image signal supplied from the A/D converter 104.

In step S1201, the synchronization/reduction circuit 1104 generates a reduced image signal from the image signal output from the white balance circuit 201 in accordance with a size of the image signal specified by the control circuit 106.

In step S1202, the synchronization/reduction circuit 1104 determines whether a rate of the size of the image signal specified by the control circuit 106 to a size of the image signal of a RAW format input to the image processing circuit 105 is equal to or smaller than a threshold value. In this embodiment, the threshold value is ½ since an image signal obtained from an image pickup element 102 having the Bayer arrangement is employed. When the synchronization/reduction circuit 1104 determines that the size of the image signal specified by the control circuit 106 is half of the size of the image signal input to the image processing circuit 105, the process proceeds to step S1202.

Note that the fact that the size of the image signal is reduced by half means that the numbers of pixels in a vertical and horizontal directions are reduced by half. If a rate of the size of the reduced image signal to the size of the image signal input to the image processing circuit 105 is equal to or smaller than ½, even when the reduced image signal is divided into image signals for individual colors, pixels having values 0 are not generated in the image signals of the individual colors, and accordingly, aliasing can be suppressed.

In step S1203, a reduction circuit 208 receives the reduced image signal output from the synchronization/reduction circuit 1104 and generates a low-frequency-layer image signal using the reduced image signal by the same method as step S303 shown in FIG. 3.

In step S1204, a noise suppression circuit 206 performs the same noise suppression method as step S304 shown in FIG. 3 on the image signal output from the synchronization/reduction circuit 1104, that is, a high-frequency-layer image signal.

In step S1205, the synthesis ratio calculation circuit 207 calculates a synthesis ratio of the high-frequency-layer image signal and the low-frequency-layer image signal using a method the same as that in step S305 shown in FIG. 3.

In step S1206, the image synthesis circuit 211 synthesizes the high-frequency-layer image signal with the low-frequency-layer image signal using a method the same as that in step S306 shown in FIG. 3 so as to obtain image signals constituted by a new G signal, a new R signal, and a new B signal. The image signals generated by the image synthesis circuit 211 are supplied to the sampling circuit 1102.

Note that, when the size of the reduced image signal is equal to or smaller than half the size of the image signal input to the image processing circuit 105, the sampling circuit 1102 does not perform a sampling process and outputs the image signals without change to the third luminance signal generation circuit 1105.

In step S1207, the third luminance signal generation circuit 1105 generates a luminance signal Y in accordance with Expression (21) of the first embodiment. Since the image signals input to the third luminance signal generation circuit 1105 have been subjected to a synchronization process, unlike the first luminance signal generation circuit 212, the third luminance signal generation circuit 1105 is not required to perform another synchronization process.

Then, the luminance mixing circuit 1106 outputs a luminance signal generated by the third luminance signal generation circuit 1105 as the luminance signal Y without change.

In step S1208, the color generation circuit 215 generates color difference signals U and V by the same method as step S311 shown in FIG. 3 and outputs the color difference signals U and V.

In this way, when the rate of the size of the reduced image signal to the size of the image signal input to the image processing circuit 105 is equal to or smaller than ½, the reduced image signal output from the synchronization/reduction circuit 1104 serves as an image signal which has been synchronized and in which an adverse effect of aliasing is suppressed. Specifically, even when the reduced image signal is divided into a plurality of image signals corresponding to different frequency bands and the image signals are synthesized with one another, the adverse effect of aliasing is not increased. Accordingly, when the third luminance signal generation circuit 1105 generates the luminance signal Y using the image signal output from the image synthesis circuit 211, a luminance signal in which the adverse effect of aliasing is suppressed may be obtained without mixing a plurality of luminance signals generated by different methods.

Therefore, when the size of the reduced image signal is equal to or smaller than half the size of the image signal input to the image processing circuit 105, the sampling circuit 1102 does not perform a sampling process and outputs the input image signal to the third luminance signal generation circuit 1105 without change.

Referring back to step S1202, when the size of the reduced image signal is not equal to or smaller than the size of the image signal input to the image processing circuit 105, the synchronization/reduction circuit 1104 proceeds to step S302.

Then, the digital still camera performs the same processes as step S302 to step S311 shown in FIG. 3. Note that the synchronization/reduction circuit 1104 performs the same process as the synchronization circuit 205 shown in FIG. 2, the sampling circuit 1102 performs the same process as the sampling circuit 203 shown in FIG. 2, and the luminance mixing circuit 1106 performs the same process as the luminance mixing circuit 214 shown in FIG. 2.

As described above, in the digital still camera according to this embodiment, if the image processing circuit 105 can reduce a size of an image signal to the degree that the adverse effect of aliasing is suppressed, the image processing circuit 105 does not perform a process of synthesizing a plurality of luminance signals generated by different methods. By this, a process of suppressing aliasing is performed only when needed, and accordingly, a processing load of the digital still camera can be reduced.

Note that, although a case where the user specifies a size of an image signal to be output using the operation member 110 has been described as an example, the present invention is not limited to this. When a size of an image signal obtained at a time of capturing a movie is half a size of an image signal obtained at a time of capturing of a still image of a RAW format, the process may automatically proceed from step S1202 to step S1203 provided that the movie is being captured.

It is apparent that, as a configuration for realizing the noise suppression process performed by the image processing circuit 105, a configuration in which an original image signal is divided into a plurality of frequency components corresponding to different frequency bands which do not overlap with one another may be employed as shown in FIG. 10.

Note that, in the foregoing embodiments, the low-frequency-layer image signal is generated by reducing the original signal. However, a low-frequency-layer image signal may be generated by performing an LPF process on an original image signal without reducing the image signal.

Furthermore, in any of the embodiments, the different processes are performed by the different circuits shown in the drawings for simplicity of the description. However, the circuits may be collectively configured as a single circuit or one of the processes performed by the circuits may be performed by some of the circuits.

Other Embodiments

The present invention may be realized by performing a process described below. That is, software (a program) which realizes functions of the foregoing embodiments is supplied to a system or an apparatus through a network or one of various storage media, and a computer (or a CPU, an MPU, or the like) included in the system or the apparatus reads and executes the program.

As described above, according to the present invention, a noise suppression process is performed by dividing an image signal according to a plurality of bands while and aliasing can be suppressed.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of International Patent Application No. PCT/JP2010/052028, filed Feb. 12, 2010, which is hereby incorporated by reference herein in its entirety.

What is claimed is:

1. An apparatus comprising:
a generation unit configured to receive a first image data in which color signals corresponding to a plurality of colors are arranged and generate a plurality of image data corresponding to different frequency bands using the first image data;
a synthesis unit configured to generate a second image data by synthesizing the plurality of image data;
a sampling unit configured to generate third image data from the second image data by sampling the color signals corresponding to the colors in accordance with the arrangement;
a first generation unit configured to receive the third image data and generate first signals using image signals obtained by performing compensation on pixels which do not correspond to first color signals among pixels of the third image data using the first color signals;
a second generation unit configured to receive the third image data and generate second signals using the color signals corresponding to the plurality of colors; and
a mixing unit configured to output signals obtained by synthesizing the first and second signals or signals obtained by selecting one of the first and second signals.

2. The apparatus according to claim 1,
wherein the generation unit generates image data corresponding to frequency bands lower than that of the input image data.

3. The apparatus according to claim 1, further comprising:
a suppression unit configured to perform a noise suppression process on individual image data which correspond to the different frequency bands and which are generated by the generation unit.

4. The apparatus according to claim 1,
wherein the third image data includes red, green, and blue signals which are generated by an element having a Bayer arrangement, and
the first color signal corresponds to the green signal.

5. The apparatus according to claim 1, further comprising:
a reduction unit configured to reduce the image data in which the signals corresponding to the plurality of colors are arranged so as to generate a reduced image data; and a third generation unit configured to generate third signals using the third image data, wherein the generation unit generates a plurality of image data corresponding to the different frequency bands using the reduced image data, and the mixing unit outputs the third signals when a rate of a size of the reduced image data to a size of the image data in which the signals corresponding to the colors are arranged is equal to or smaller than a threshold value.

6. An apparatus comprising:

a reduction unit configured to reduce a first image data in which color signals corresponding to a plurality of colors are arranged so as to generate a second image data;

a generation unit configured to receive the second image data and generate a plurality of image data corresponding to different frequency bands from the second image data;

a synthesis unit configured to generate a third image data by synthesizing the plurality of image data;

a first generation unit configured to receive the third image data and generate first signals using image signals obtained by performing compensation on pixels which do not correspond to first color signals among the third image data using the first color signals;

a second generation unit configured to receive the third image data and generate second signals using the color signals corresponding to the plurality of colors;

a third generation unit configured to generate third signals using the third image data; and a mixing unit configured to output signals obtained by synthesizing the first and second signals with each other or signals obtained by selecting one of the first and second signals when a rate of a size of the second image data to a size of the first image data is larger than a threshold value, and output the third signals when the rate is equal to or smaller than the threshold value.

7. A method comprising:

receiving a first image data in which color signals corresponding to a plurality of colors are arranged and generating a plurality of image data corresponding to different frequency bands using the received first image data;

generating a second image data by synthesizing the plurality of image data;

generating a third image data from the second image data by sampling the color signals corresponding to the colors in accordance with the arrangement;

receiving the third image data and generating first signals using image signals obtained by performing compensation on pixels which do not correspond to first color signals among pixels of the third image data using the first color signals;

receiving the third image data and generating second signals using the color signals corresponding to the plurality of colors; and outputting signals obtained by synthesizing the first and second signals or signals obtained by selecting one of the first and second signals.

8. The method according to claim 7, wherein the generating generates image data corresponding to frequency bands lower than that of the input image data.

9. The method according to claim 7, further comprising:

performing a noise suppression process on individual image data which correspond to the different frequency bands and which are generated by the generating.

10. The method according to claim 7, wherein the third image data includes red, green, and blue signals which are generated by an element having a Bayer arrangement, and the first color signal corresponds to the green signal.

11. The method according to claim 7, further comprising:

reducing the image signal in which the data corresponding to the plurality of colors are arranged so as to generate a reduced image data; and generating third signals using the third image data, wherein the generating generates a plurality of image data corresponding to the different frequency bands using the reduced image data, and the outputting outputs the third signals when a rate of a size of the reduced image data to a size of the image data in which the signals corresponding to the colors are arranged is equal to or smaller than a threshold value.

12. A non-transitory computer readable storage medium storing a program for causing a computer to execute each step of a method defined in claim 7.

13. The non-transitory computer readable storage medium according to claim 12, wherein the generating generates image data corresponding to frequency bands lower than that of the input image signal.

14. The non-transitory computer readable storage medium according to claim 12, wherein the method further comprises:

performing a noise suppression process on individual image data which correspond to the different frequency bands and which are generated by the generating.

15. The non-transitory computer readable storage medium according to claim 12, wherein the third image data includes red, green, and blue signals which are generated by an element having a Bayer arrangement, and the first color signal corresponds to the green signal.

16. The non-transitory computer readable storage medium according to claim 12, wherein the method further comprises:

reducing the image signal in which the data corresponding to the plurality of colors are arranged so as to generate a reduced image data; and generating third signals using the synthesized third image data, wherein the generating generates a plurality of image data corresponding to the different frequency bands using the reduced image data, and the outputting outputs the third signals when a rate of a size of the reduced image data to a size of the image data in which the signals corresponding to the colors are arranged is equal to or smaller than a threshold value.

17. A method comprising:

reducing a first image data in which color signals corresponding to a plurality of colors are arranged so as to generate a second image data;

receiving the second image data and generating a plurality of image data corresponding to different frequency bands from the second image data;

generating a third image data by synthesizing the plurality of generated image data;

receiving the third image data and generating first signals using image signals obtained by performing compensation on pixels which do not correspond to first color signals among the third image data using the first color signals;

receiving the third signal data and generating seconds signal using the color signals corresponding to the plurality of colors;

generating third signals using the third image data; and outputting signals obtained by synthesizing the first and second signals with each other or signals obtained by selecting one of the first and second signals when a rate of a size of the second image data to a size of the first image data is larger than a threshold value, and outputting the third signals when the rate is equal to or smaller than the threshold value.

18. A non-transitory computer readable storage medium storing a program for causing a computer to execute each step of an image processing method defined in claim 17.

* * * * *